April 28, 1942.  A. SHAPIRO  2,281,328
MOTION PICTURE PROJECTOR
Filed Dec. 12, 1940  3 Sheets-Sheet 1
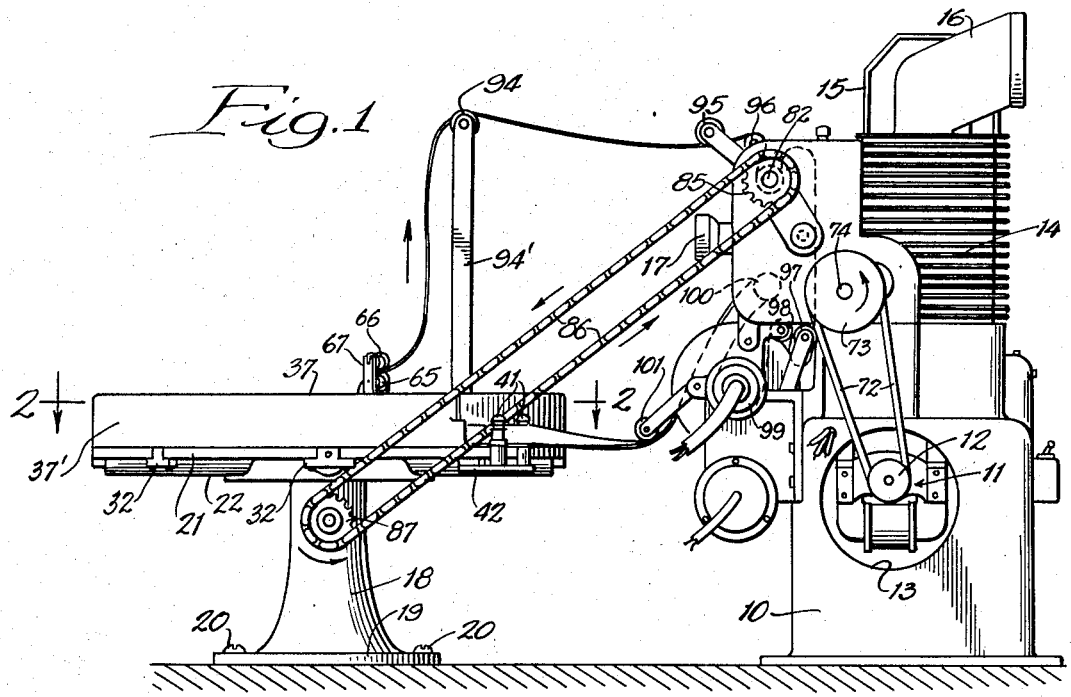
Fig.1
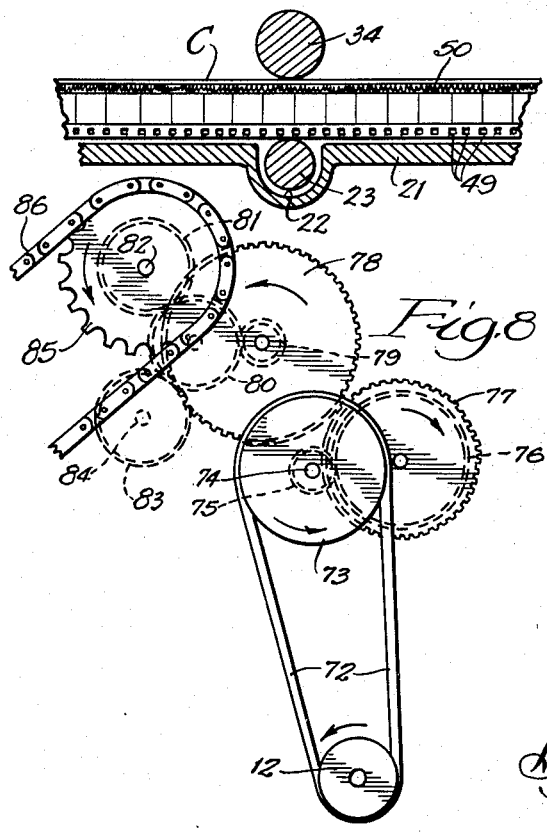
Fig.5
Fig.8
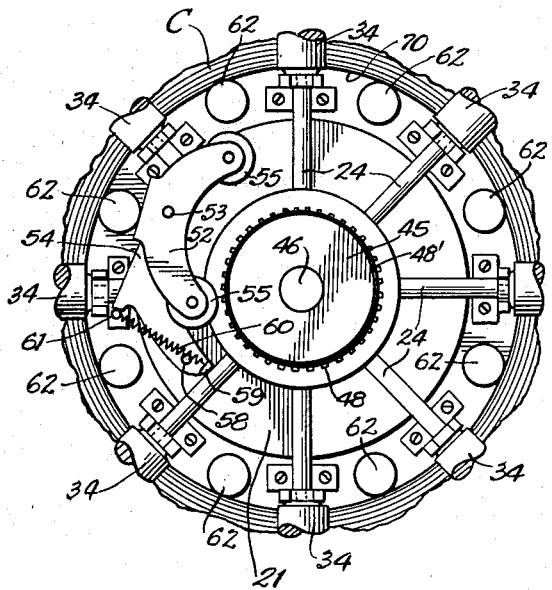
Fig.6
Inventor:
Abraham Shapiro,
By Evans, Pond & Anderson,
Attorneys.

April 28, 1942. A. SHAPIRO 2,281,328

MOTION PICTURE PROJECTOR

Filed Dec. 12, 1940 3 Sheets-Sheet 2

Inventor:
Abraham Shapiro,
By Soans, Pond & Anderson,
Attorneys.

April 28, 1942. A. SHAPIRO 2,281,328
MOTION PICTURE PROJECTOR
Filed Dec. 12, 1940 3 Sheets-Sheet 3
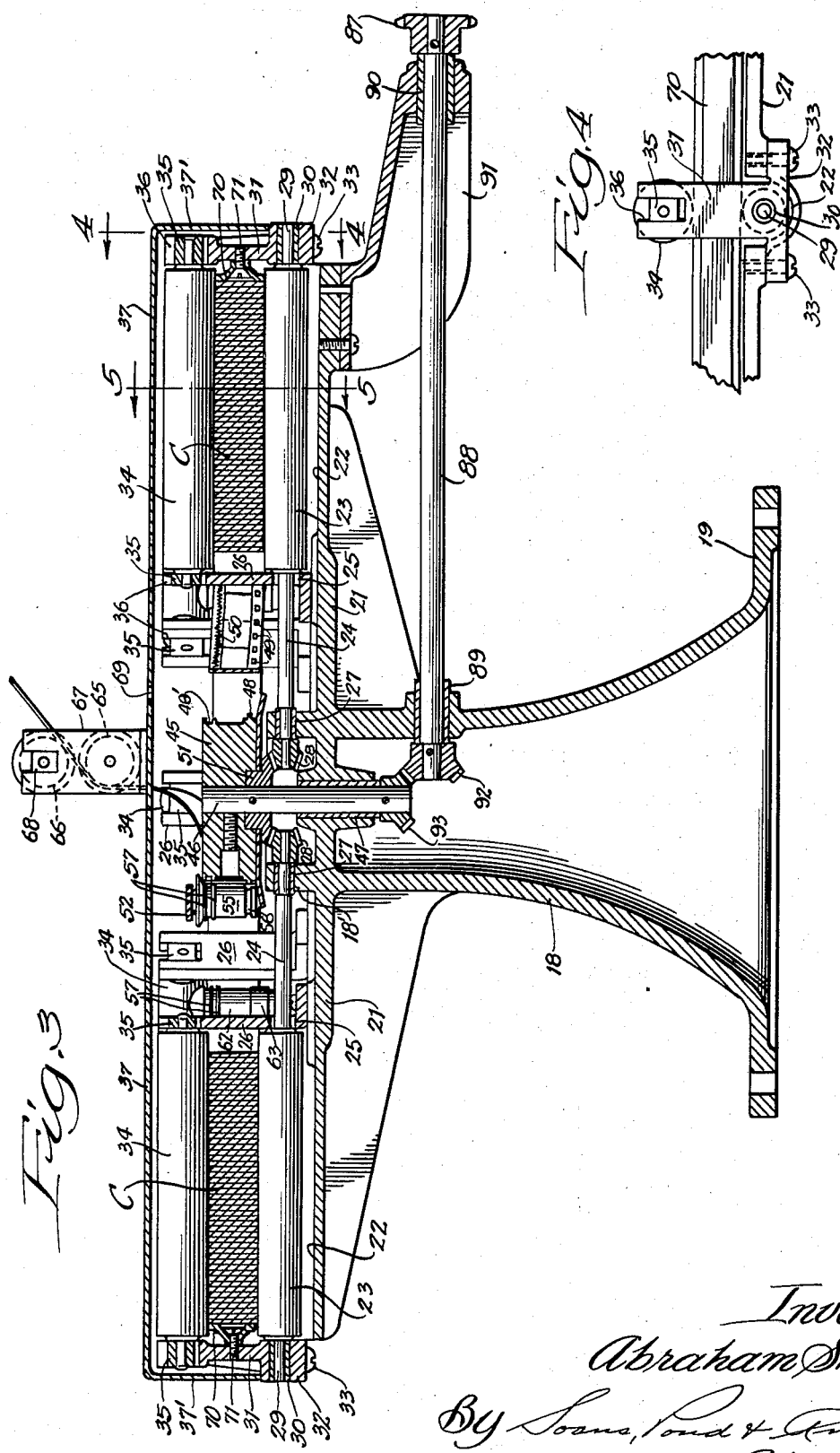
Inventor:
Abraham Shapiro,
BY Evans, Pond & Anderson,
Attorneys.

Patented Apr. 28, 1942

2,281,328

UNITED STATES PATENT OFFICE 2,281,328

MOTION PICTURE PROJECTOR

Abraham Shapiro, Chicago, Ill., assignor to Ampro Corporation, Chicago, Ill., a corporation of Illinois Application December 12, 1940, Serial No. 369,871

6 Claims. (Cl. 88—18.7)

This invention relates to motion picture projectors of the continuous or endless film type, and is an improvement upon a motion picture projector of this type forming the subject matter of my pending application, Serial No. 346,137, filed July 18, 1940. In the aforesaid application the film holder on which the coil of film is wound is disposed in a vertical plane, and the inner lamination of the coil is drawn off, guided through the projector, and returned to the film holder, being wound on the outer surface of the coil. In these machines, where the film is of considerable length, the coil is quite heavy, often weighing as much as ten or twelve pounds, and all of this weight is, of course, distributed throughout the upper half of the annular body of film. Furthermore, since the inner laminations of the body are smaller than the outer laminations, and the film emerges from the innermost portion of the coil at the same speed that it is laid on the outermost portion, some slippage necessarily occurs between the laminations wound on the film holder, and this causes some abrasion and wear between adjacent laminations, which sometimes mars the surface of the film, this, of course, being aggravated by the weight of the coil.

It has heretofore been proposed to obviate the above described faults by mounting the film holder horizontally, and supporting the film on a group of positively driven radially disposed rollers, whereby pressure of adjacent laminations of the coil on each other and an excessive pulling strain on the film are avoided.

My present invention relates to a film holder of the last named horizontal type, and the general object of the invention is to provide improvements in such a holder better adapting it to cooperate with an endless film, other objects being to provide improved means for guiding and feeding the film to and from the film coil on the holder, to provide improved means for maintaining the form of the film on the holder, and to provide an improved removable cover for protecting the film on the holder from dust and dirt while permitting easy application and removal of the film coil to and from the holder.

Further objects and attendant advantages of the present invention will be apparent to persons skilled in the art from the following detailed description, taken in connection with the accompanying drawings, wherein I have illustrated a practical and improved embodiment of the invention, and in which—

Fig. 1 is a side elevation of the complete machine.

Fig. 3 is a vertical axial section of the film holder, taken on the line 3—3 of Fig. 2.

Figs. 4 and 5 are detail vertical sections taken on the lines 4—4 and 5—5, respectively, of Fig. 3.

Figure 2:
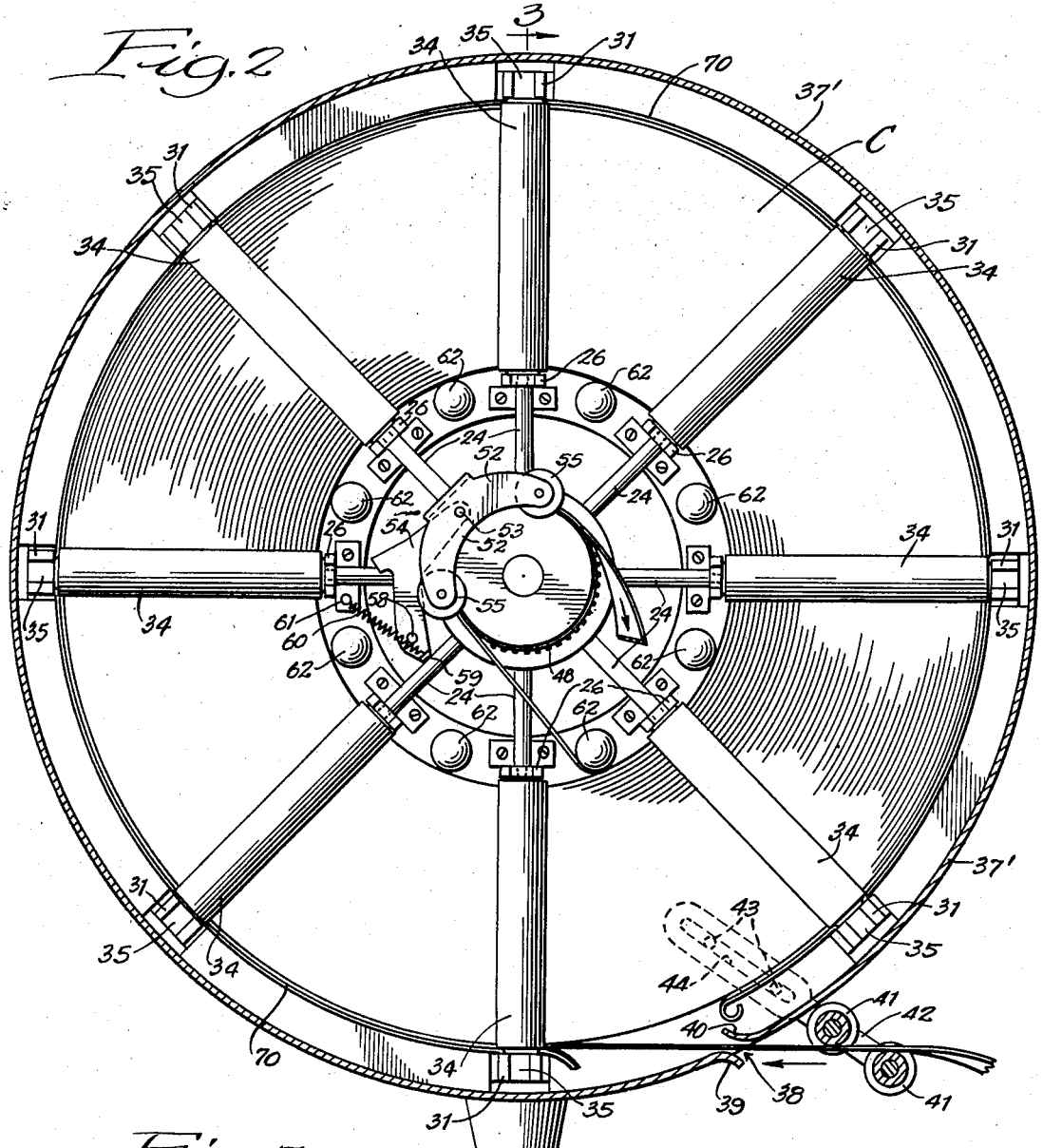
Fig. 2 is an enlarged plan section of the film holder, taken on the line 2—2 of Fig. 1.

Fig. 6 is a fragmentary top plan, with the cover omitted, showing the central portions of the parts illustrated in Fig. 2, and also showing a release position of a pivoted film presser which normally holds the film in cooperative engagement with a central film driving sprocket.

Figure 7:
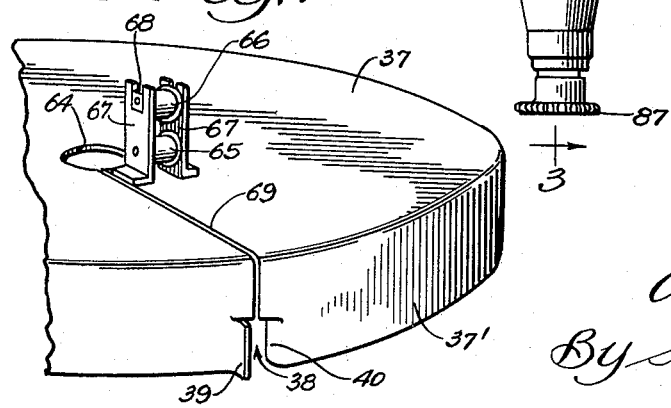

Fig. 7 is a fragmentary perspective view of the cover of the film holder, showing means for disengaging the same from the film when it is removed.

Fig. 8 is an isolated view, in side elevation, of a speed reducing drive from the motor shaft to a sprocket which drives the film engaging parts of the film holder.

Referring to the drawings, the projector, which appears at the right of Fig. 1, is substantially a copy of the projector shown and described in my aforesaid pending application; and briefly describing the principal parts of this projector, 10 designates a motor housing, in which is mounted an electric motor designated as an entirety by 11. On one end of the motor shaft is a pulley 12, and on its opposite end is a blower (not shown) which draws air through a large opening 13 in the motor casing over the motor and directs its upwardly through a finned lamp housing 14 around an electric lamp in said housing. On top of the lamp housing 14 is a cap 15 from which extends a lateral air discharge flue 16 through which the heated air is discharged to atmosphere. The light beam from the lamp in the housing 14 is directed through an opening in the side wall of the housing to and through the usual lens mounting or objective 17 by which the light beam, passing through the film, is projected onto the screen.

Turning now to a description of the improved film holder, in which the novel features of the present invention mainly reside, 18 designates a hollow pedestal formed with a base 19 which may be secured to the floor or other support by screws 20 passing through holes in the base. Integral with the top portion of the pedestal 18 is a disc platform 21, in the upper surface of which are a group of equally spaced radial grooves 22 (Fig. 5) that are occupied by lower radial rollers 23. These rollers are formed with inner spindles 24 that extend through holes 25 in the lower portions of the vertical limbs of a group of L-shaped brackets 26, the horizontal limbs of which are secured to the top of the platform 21. The spindles 24 are journaled in bearings 27 formed in a vertical tubular extension 18' of the pedestal 18, and on their inner ends carry bevel pinions 28. The rollers 23 have on their other ends short spindles 29 that are journaled in bearings 30 (see Fig. 4) carried by upstanding brackets 31, said brackets being secured in place by integral base plates 32 attached by screws 33 to the underside of the platform 21.

Freely journaled in and between the upper ends of the brackets 26 and 31 is a similar group of upper radial rollers 34, directly above and parallel with the rollers 23. Preferably, and as herein shown, the end spindles of the rollers 34 are journaled in blocks 35 that are slidable in vertical slots 36 of the brackets, so that the rollers 34, which rest on the upper surface of the film coil C and by their weight hold the coil down on the rollers 23, are free to rise and fall slightly with any irregularities in the top surface of the coil, and also adapt the holder to films of differing widths.

Surmounting the film holder is a cap or cover 37 formed with a depending flange 37' that completely encircles the film coil C and the upper rollers 34, said flange resting at its lower edge on the base portions of the outer group of brackets 31, as clearly shown in Fig. 3. This cover serves to protect the parts within the film holder against the settling of dust and dirt on said parts.

As best shown in Figs. 2 and 7, the flange 37' of the cover is formed with a vertical slot 38 through which the film from the projector enters the film holder to be wound on the outer periphery of the film coil C. To prevent any injury to the film as it enters the film holder the opposed edge portions of the slot 38 are curved outwardly and inwardly respectively as shown at 39 and 40; and the film just prior to entering the slot 38 passes between a pair of vertical guide rollers 41 mounted on a bracket arm 42 adjustably secured to the underside of the platform 21 by a pair of pins 43 engaged with a longitudinal slot 44 in the bracket arm 42.

The innermost lamination of the film coil C is drawn off by means of a sprocket 45 (Fig. 3) that is keyed to the upper portion of a vertical shaft 46 journaled in a vertical bearing 47 in the center of the platform 21. This sprocket 45 is formed on its lower portion with a ring of teeth 48 that cooperate with a row of holes 49 in the lower edge portion of the film; and the upper portion of the sprocket is formed with an annular groove 48' that, as the film travels around the sprocket, registers with the sound track 50 on the upper edge of the film, so that the sound track does not come into contact with the sprocket and cannot be injured thereby. Keyed to the vertical shaft 46 just beneath the sprocket 45 is a bevel gear 51 that meshes with and drives the bevel pinions 28 on the spindles 24 of the lower rollers 23.

To insure the cooperative engagement of the film with the sprocket 45, I preferably employ a pivoted film presser, which is shown in working position in Fig. 2 and in release or idle position in Fig. 6. This consists of a yoke 52 that is centrally pivoted at 53 on the long arm of a lever 54, and carries on its ends depending rollers 55 (see Fig. 3) that are movable into and out of contact with the portion of the film engaged with the periphery of the sprocket 45. Each of these rollers is formed on its lower portion with an annular groove 56 that straddles the teeth 48 of the sprocket 45, so as to press the holes 49 of the film into engagement with the sprocket teeth 48. The upper portion of the roller 55 is preferably formed with a pair of spaced narrow annular ribs 57 that press the portions of the film bordering the sound track 50 against the periphery of the sprocket, but prevent direct contact of the roller with the sound track. In these machines it is quite essential to prevent any contact of either side of the sound track with a moving part of the machine. The lever 54 is itself pivoted at 58 on an underlying support, and to a toe 59 on the free end of the short arm of said lever is connected one end of a pull spring 60, the other end of said spring being attached to a pin 61 on the base of one of the brackets 26. The spring 60 is so mounted that it constitutes an over-the-center spring. When the lever 54 is in the position shown in Fig. 2, the yoke 52 has been shifted inwardly toward the sprocket 45, carrying the rollers 55 into pressing engagement with the film and sprocket. A slight manual outward movement of the long arm of lever 54 causes the spring 60 to snap across its pivot center 58, and this retracts the yoke and its rollers from the sprocket and holds them in the retracted position shown in Fig. 6. This retraction of the film presser from the sprocket occurs when withdrawing a film from the holder and replacing a new film thereon.

Journaled on upright spindles mounted on the platform 21 midway between adjacent pairs of upper and lower rollers are a group of rollers 62 that form guides for the innermost lamination of the film coil C. These rollers 62 are also equipped with spaced ribs 57, functionally similar to the ribs 57 of the rollers 55, to protect the sound track 50 from contact with the rollers. On their lower portions are annular bands 63 that cooperate with ribs 57 to maintain the vertical position of the innermost lamination of the coil. As shown in Fig. 2, one of the rollers 62 serves to guide the innermost lamination of the coil into engagement with the sprocket 45.

As the film passes off the sprocket 45, it travels upwardly through a central hole 64 (Fig. 7) in the top wall of the cover 37, and thence between lower and upper horizontal guide rolls 65 and 66 that are journaled in and between a pair of vertical brackets 67 mounted on the cover 37 adjacent to the hole 64. The lower roll 65 is journaled directly in the brackets 67, while the upper roll 66 is journaled in a pair of bearing blocks 68 slidably mounted in vertical slots in the upper ends of the brackets 67, so that the upper roll can be withdrawn to free the film when the cover is withdrawn. To effect the removal of the cover before the film itself is removed, there is formed in the cover 37 and its flange 37' a narrow radial slot 69 (Fig. 7) that communicates at one end with the film entrance slot 38 and at its other end with the film exit hole 64. To remove the cover, the upper guide roller 66 is first removed, and the cover is then raised sufficiently to free the incoming lamination of the film from the slot 38 and is then shifted laterally, permitting the outgoing portion of the film to slide through the slots 69 and 38 and thus be freed from the cover.

In order to keep the film coil C from spreading and prevent the outer laminations of the coil from dropping down behind the outer ends of the rollers 23, there is provided a transversely concave highly polished steel band 70 that is secured to the outer brackets 31 by screws 71, and bears lightly at its edges on the upper and lower edge portions of the film coil C, as clearly shown in Fig. 3. Also, as shown in Fig. 2, this guide band 70 is interrupted at a point opposite the film entrance slot 38, with its end portions outwardly curled, to permit passage of the film onto the outer periphery of the film coil.

It remains to briefly describe the drive from the motor 11 to the vertical shaft 46 of the film holder, and also the path of the film from the film holder, to and through the projector, and back to the film holder. As before stated, the film engaging parts of the projector are identical with the film engaging parts disclosed in my former application, Serial No. 346,137; and hence are not fully disclosed in this application wherein no claim is made to the said parts.

Referring to Figs. 1 and 8, from pulley 12 a belt 72 drives a pulley 73 fast on a cam shaft 74 that actuates the film claw. From cam shaft 74 a speed reducing gear train extends upwardly, consisting of a pinion 75 on cam shaft 74, gear 76, gear 77, gear 78, pinion 79, and gear 80 driving a gear 81 fast on a shaft 82 of an upper film driving sprocket, that is located above the usual guideway across the light beam and maintains the usual loop in the film between the film driving sprocket and the intermittent film feeding claw. Gear 80 also drives another gear 83 that is fast on a shaft 84 that drives a lower film driving sprocket located below the guideway across the light beam. Fast on the outer end of shaft 82 is a sprocket 85 that, through a chain 86 drives a sprocket 87 (Figs. 2 and 3) keyed on the outer end of a horizontal shaft 88 that is journaled in and between bearings 89 and 90 formed in the pedestal 18 and a depending bracket 91 attached to the underside of the platform 21. On the inner end of shaft 88 is a bevel gear 92 meshing with and driving a bevel gear 93 keyed on the lower end of shaft 46.

The path of the film from the film holder to and through the projector, and back to the film holder can be readily traced on Fig. 1. From the guide rolls 65, 66, the film travels upwardly over a guide roll 94 on the upper end of a vertical standard 94' rising from the holder platform, thence between a pair of guide rolls 95 and 96 on the projector, beneath and around the upper film feed sprocket on shaft 82, thence in the form of a free upstanding loop down through the guideway across the light beam, thence between a pair of tension rolls 97 and 98 to and beneath a rotating drum 99 that guides the sound track 50 on the edge of the film across the slot in the photoelectric cell housing through which the light beam from the exciter lamp is projected onto the photo-electric cell. This drum 99 and its associated parts are borrowed from my former Patent No. 2,099,376, granted November 16, 1937. From drum 99 the film continues up and over the lower film driving sprocket 100, thence it passes downwardly beneath a pivoted guide roll 101, between the guide rolls 41 and through the slot 38, onto the outer periphery of the film coil on the film holder.

It will be observed that in my present improved film holder, the film is not drawn off from the latter solely by a pull on the film, which tends to, and often does, break the film at the most exciting point in the picture being exhibited. The pulling strain on the film caused by the sprocket 45 is very substantially relieved by the rotary drive of the entire film coil caused by the rotation in the proper direction of the lower set of rollers 23. The present improvement also avoids abrasion of the film through the rubbing of adjacent turns on each other under the weight of the coil (as in the vertical type of film holder), since there is nothing pressing the coils or laminations of the film coil against each other.

The use of the cover 37 obviously keeps the film coil and the parts associated therewith clean and substantially free from atmospheric dust and dirt, while at the same time readily permitting the removal of a used film from the holder and the substitution of a new film.

The upper freely turning rollers 34 are not indispensable elements of the apparatus, but are preferably employed in cooperation with the band 70, to maintain the film coil C in good working form and condition when the machine is operating.

Changes in the details of structure and arrangement may be resorted to within the scope and purview of the invention as defined in the following claims.

I claim:

1. A film holder for continuous film motion picture projectors, comprising a horizontal platform, lower smooth surfaced radial rollers of uniform diameter horizontally journaled on said platform on which the film coil is laid, means for rotating said rollers, upper freely rotatable radial gravity rollers above and parallel with said lower rollers adapted to rest on and be rotated by the film coil and bodily movable vertically, members engaged with the outer and inner peripheries of the coil to maintain the form of the latter, a horizontal sprocket coaxial with said platform for drawing off the outgoing film from the center of said coil, means for rotating said sprocket, and means for guiding the returning film onto the outer periphery of said coil.

2. In combination with a film holder, a cover for said film holder comprising a horizontal top plate and a depending flange respectively overlying and encircling the parts mounted on said platform, said flange formed with an opening to admit the passage of the incoming film and said top plate formed with an opening for the passage of the outgoing film and with a radial slot connecting said openings to permit disengagement of said cover from said film when said cover is removed.

3. A film holder for continuous film motion picture projectors, comprising a horizontal platform, horizontal radial rollers journaled on the said platform on which the film coil is laid, means for engaging the coil to maintain the form of the latter, a horizontal sprocket coaxial with said platform for drawing off the outgoing film from the center of said coil, means for guiding the returning film onto the outer periphery of said coil, and means for rotating said radial rollers consisting of a vertical shaft journaled in the platform, cooperating miter gears on an intermediate portion of said shaft and the inner ends of said rollers, and means for driving said vertical shaft; the horizontal sprocket for drawing off the outgoing film being keyed on the upper end of said vertical shaft.

4. A film holder for continuous film motion picture projectors, comprising a horizontal platform, lower radial rollers journaled on said platform on which the film coil is laid, upper radial rollers adapted to rest on the film coil and bodily movable vertically, members engaged with the outer and inner peripheries of the coil to maintain the form of the latter, a sprocket for drawing off the outgoing film from the center of said coil, means for rotating said sprocket, and means for guiding the returning film onto the outer periphery of said coil; said platform being equipped with outer and inner circular groups of upstanding brackets, and the spindles of the upper radial rollers being journaled at their ends in and between opposed brackets of said circular groups.

5. An embodiment of the subject-matter defined in claim 4, wherein the platform is supported on a hollow pedestal formed with an upper end portion above said platform and said platform is equipped with outer and inner circular groups of upstanding brackets, the spindles of the upper radial rollers being journaled at their ends in and between opposed brackets of said circular groups, and the outer end spindles of the lower radial rollers being journaled in the brackets of said outer circular group and their inner end spindles extending through said holes in the brackets of said inner circular group and being journaled in the upper end portion of said hollow pedestal.

6. A film holder for continuous film motion picture projectors, comprising a horizontal platform formed in its top surface with a group of equally spaced radial grooves, horizontal radial rollers journaled on said platform and occupying said grooves, on which rollers the film coil is laid, means to maintain the form of the coil consisting of a band encircling the outer periphery of the coil, a circular group of vertical rollers on the platform engaged with the inner periphery of the coil, horizontal radial rollers resting on the top of the coil, and vertically movable bearings in which the spindles of said last named rollers are journaled; a sprocket for drawing off the outgoing film from the center of said coil, means for driving said sprocket, and means for guiding the returning film onto the outer periphery of said coil.

ABRAHAM SHAPIRO.